United States Patent
Xu (10) Patent No.: US 11,864,028 B2
(45) Date of Patent: Jan. 2, 2024

(54) DATA TRANSMISSION METHOD, TERMINAL DEVICE AND CORE NETWORK DEVICE

(71) Applicant: GUANGDONG OPPO MOBILE TELECOMMUNICATIONS CORP., LTD., Guangdong (CN)

(72) Inventor: Yang Xu, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 297 days.

(21) Appl. No.: 17/336,790

(22) Filed: Jun. 2, 2021

(65) Prior Publication Data
US 2021/0289398 A1    Sep. 16, 2021

Related U.S. Application Data

(63) Continuation of application No. PCT/CN2019/081579, filed on Apr. 4, 2019.

(51) Int. Cl.
*H04W 4/00*    (2018.01)
*H04W 28/08*    (2023.01)
(Continued)

(52) U.S. Cl.
CPC ......... *H04W 28/0933* (2020.05); *H04W 8/24* (2013.01); *H04W 28/0268* (2013.01); *H04W 28/10* (2013.01)

(58) Field of Classification Search
CPC . H04W 28/02; H04W 28/0268; H04W 28/08; H04W 28/10
See application file for complete search history.

(56) References Cited

U.S. PATENT DOCUMENTS

| 10,117,100 B2 | 10/2018 | John et al. |
| 2004/0136324 A1* | 7/2004 | Steinberg ............... H04L 45/00 370/254 |

(Continued)

FOREIGN PATENT DOCUMENTS

| CN | 102067706 A | 5/2011 |
| CN | 103369616 A | 10/2013 |

(Continued)

OTHER PUBLICATIONS

3GPP TR 23.793 V16.0.0 (Dec. 2018), 3rd Generation Partnership Project; Technical Specification Group Services and System Aspects; Study on access traffic steering, switch and splitting support in the 5G system architecture (Release 16). 114 pages.

(Continued)

*Primary Examiner* — Chi H Pham
*Assistant Examiner* — Elisabeth Benoit Magloire
(74) *Attorney, Agent, or Firm* — PERKINS COIE LLP (57) ABSTRACT

The embodiments of the disclosure relate to a data transmission method, a terminal device and a Core Network (CN) device. The method includes that: a terminal device determines a target access type for uplink data in multiple different access types; the terminal device determines a target-type CN corresponding to the target access type according to a correspondence between an access type and a CN type; and the terminal device sends the uplink data by use of at least one data flow corresponding to the target-type CN. According to the data transmission method, terminal device and CN device of the embodiments of the disclosure, transmission efficiency may be improved.

20 Claims, 3 Drawing Sheets

(51) Int. Cl.
*H04W 8/24* (2009.01)
*H04W 28/02* (2009.01)
*H04W 28/10* (2009.01)

(56) References Cited

U.S. PATENT DOCUMENTS

| | | | |
|---|---|---|---|
| 2009/0310581 A1 | 12/2009 | Lansisalmi | |
| 2014/0185603 A1 | 7/2014 | Kaippallimalil et al. | |
| 2015/0103772 A1* | 4/2015 | Carnero Ros | H04L 45/04 370/329 |
| 2017/0289888 A1* | 10/2017 | Salkintzis | H04W 36/0083 |
| 2018/0262924 A1* | 9/2018 | Dao | H04W 24/02 |
| 2019/0069182 A1 | 2/2019 | John et al. | |
| 2020/0128471 A1* | 4/2020 | Liu | H04W 40/248 |
| 2020/0213905 A1* | 7/2020 | Liu | H04W 28/08 |
| 2020/0260401 A1* | 8/2020 | So | H04W 76/50 |
| 2021/0014749 A1* | 1/2021 | Liu | H04W 36/0044 |
| 2021/0219371 A1* | 7/2021 | Youn | H04W 48/18 |
| 2021/0329541 A1* | 10/2021 | Salkintzis | H04W 76/16 |
| 2022/0303854 A1* | 9/2022 | Salkintzis | H04W 36/26 |

FOREIGN PATENT DOCUMENTS

| | | |
|---|---|---|
| CN | 104219769 A | 12/2014 |
| CN | 108574969 A | 9/2018 |
| WO | 2019032972 A8 | 3/2019 |

OTHER PUBLICATIONS

3GPP TS 23.501 V16.0.2 (Apr. 2019), 3rd Generation Partnership Project; Technical Specification Group Services and System Aspects; System Architecture for the 5G System; Stage 2 (Release 16). 317 pages.

Supplementary European Search Report in the European application No. 19922329.8, dated Mar. 2, 2022.12 pages.

International Search Report in the international application No. PCT/CN2019/081579, dated Dec. 30, 2019.

3GPP. "Study on Access Traffic Steering, Switching and Splitting support in the 5G system architecture (Release 16)" 3GPP TR23. 793 v1.0.0, Technical Specification Group Services and System Aspects, Sep. 30, 2018 (Sep. 30, 2018), sections 5.5, 5.6, 6.1-6.3 and 6.11.

3GPP TS 23.501 V16.0.0, 3rd Generation Partnership Project, Technical Specification Group Services and System Aspects, "System Architecture for the 5G System, Stage 2 (Release 16)", Mar. 2019 (Mar. 2019).

SA WG2 Meeting #132 S2-1903136, Apr. 8-12, 2019, Xi'an, China (revision of S2-19xxxxx), Title:ATSSS functionality in precense of EPS interworking, Telstra, Deutsche Telekom, BT, Orange, Ericsson, Nokia, Nokia Shanghai Bell. 4 pages.

SA WG2 Meeting #132 S2-1903137, Apr. 8-12, 2019, Xi'an, China (revision of S2-19xxxxx), Source: Telstra, Deutsche Telecom, BT, Ericsson, Nokia, Nokia Shanghai Bell, Title:Support for Hybrid Access, ATSSS and EPC IWK. 6 pages.

SA WG2 Meeting #132 S2-1903135, Apr. 8-12, 2019, Xi'an, China, Title:ATSSS and EPS IWK, Telstra, Deutsche Telekom, BT, Orange, Ericsson, Nokia, Nokia Shanghai Bell. 8 pages.

First Office Action of the Chinese application No. 202010523635.5, dated Jul. 21, 2021. 13 pages with English translation.

SA WG2 Meeting #127 S2-184475, Apr. 16-20, 2018, Sanya, China, Source: Huawei, HiSilicon, Title: ATSSS Rule definition and update of TFCP, Document for: Approval, Agenda Item: 6.8, Work Item / Release: FS_ATSSS /Rel-16. 10 pages.

Second Office Action of the Chinese application No. 202010523635.5, dated Oct. 8, 2021. 12 pages with English translation.

Written Opinion of the International Search Authority in the international application No. PCT/CN2019/081579, dated Dec. 30, 2019. 7 pages with English translation.

* cited by examiner

DATA TRANSMISSION METHOD, TERMINAL DEVICE AND CORE NETWORK DEVICE

CROSS-REFERENCE TO RELATED APPLICATION

This is a continuation application of International Application No. PCT/CN2019/081579 filed on Apr. 4, 2019, the contents of which are hereby incorporated by reference in its entirety.

TECHNICAL FIELD

The disclosure relates to the field of communication, and particularly to a data transmission method, a terminal device and a Core Network (CN) device.

BACKGROUND

In a 5th-Generation (5G) network, a Protocol Data Unit (PDU) session may use multiple access technologies to perform data transmission. For example, both a 3rd Generation Partnership Project (3GPP) access technology (for example, Long Term Evolution (LTE) and New Radio (NR)) and a Non-3GPP (N3GPP) (for example, Wireless Local Area Network (WLAN)) access technology may be used. Such a PDU session may be called a Multi-Access (MA) PDU session. Through an MA PDU session, for a User Equipment (UE), a higher transmission rate may be achieved and more cost may be reduced, and for a network side, an N3GPP radio resource may be utilized more efficiently, and the transmission rate may be increased.

When a terminal device establishes or modifies an MA PDU session, the terminal device may establish two routes in a 4th-Generation (4G) CN (i.e., an Evolved Packet Core (EPC)) or a 5G Core (5GC) by use of a 3GPP access technology and an N3GPP access technology.

If the two routes, established by use of 3GPP access and N3GPP access, of the MA PDU session are in the 5GC, a Session Management Function (SMF) allocates an Access Traffic Steering, Switching, Splitting (ATSSS) rule to the terminal device. The ATSSS rule is configured for the terminal device to determine an access type that should be used for an uplink data packet to be transmitted. In addition, a Quality of Service (QoS) rule may also be allocated, and the QoS rule is configured for the terminal device to determine a QoS flow that should be used for the uplink data packet to be transmitted. That is, when the terminal device is required to transmit uplink data, the terminal device may use two rules for data matching respectively.

However, if one of the two routes, established by use of 3GPP access and N3GPP access, of the MA PDU session is in the 5GC and the other is in the EPC, how the terminal device transmits the data by use of the QoS flow is a problem urgent to be solved at present.

DETAILED DESCRIPTION

The technical solutions in the embodiments of the disclosure will be described below in combination with the drawings in the embodiments of the disclosure. It is apparent that the described embodiments are not all embodiments but part of embodiments of the disclosure. All other embodiments obtained by those of ordinary skill in the art based on the embodiments in the disclosure without creative work shall fall within the scope of protection of the disclosure.

The technical solutions of the embodiments of the disclosure may be applied to various communication systems, for example, a Global System of Mobile communication (GSM), a Code Division Multiple Access (CDMA) system, a Wideband Code Division Multiple Access (WCDMA) system, a General Packet Radio Service (GPRS), an LTE system, an LTE Frequency Division Duplex (FDD) system, LTE Time Division Duplex (TDD), a Universal Mobile Telecommunication System (UMTS), a Worldwide Interoperability for Microwave Access (WiMAX) communication system or a future 5G system.

Embodiments of the disclosure provide a data transmission method, a terminal device and a CN device, which may improve transmission efficiency.

A first aspect provides a data transmission method, which may include the following operations. A terminal device determines a target access type for uplink data in multiple different access types. The terminal device determines a target-type CN corresponding to the target access type according to a correspondence between an access type and a CN type. The terminal device sends the uplink data by using at least one data flow corresponding to the target-type CN.

A second aspect provides a data transmission method, which may include the following operations. A CN device sends correspondence indication information to a terminal device. The correspondence indication information is used for indicating a correspondence between an access type and a CN type and the correspondence is used for the terminal device to establish a PDU session.

A third aspect provides a terminal device, which is configured to execute the method in the first aspect or each implementation mode thereof. Specifically, the terminal device includes function modules configured to execute the method in the first aspect or each implementation mode thereof.

A fourth aspect provides a CN device, which is configured to execute the method in the second aspect or each implementation mode thereof. Specifically, the CN device includes function modules configured to execute the method in the second aspect or each implementation mode thereof.

A fifth aspect provides a terminal device, which may include a processor and a memory. The memory may be configured to store a computer program, and the processor may be configured to call and run the computer program stored in the memory to execute the method in the first aspect or each implementation mode thereof.

A sixth aspect provides a CN device, which may include a processor and a memory. The memory may be configured to store a computer program, and the processor may be configured to call and run the computer program stored in the memory to execute the method in the second aspect or each implementation mode thereof.

A seventh aspect provides a chip, which is configured to implement the method in any aspect of the first aspect to the second aspect or each implementation mode thereof. Specifically, the chip includes a processor, configured to call and run a computer program in a memory to enable a device installed with the chip to execute the method in any aspect of the first aspect to the second aspect or each implementation mode thereof.

An eighth aspect provides a computer-readable storage medium, which is configured to store a computer program. The computer program enables a computer to execute the method in any aspect of the first aspect to the second aspect or each implementation mode thereof.

A ninth aspect provides a computer program product, which includes a computer program instruction. The computer program instruction enables a computer to execute the method in any aspect of the first aspect to the second aspect or each implementation mode thereof.

A tenth aspect provides a computer program. The computer program, which runs in a computer, enables the computer to execute the method in any aspect of the first aspect to the second aspect or each implementation mode thereof.

Through the technical solutions, for establishment of an MA PDU session across CNs by the terminal device, the terminal device, when transmitting uplink data, determines an access type by use of an ATSSS rule and then determines a data flow corresponding to a CN of a type corresponding to the access type. Therefore, when the uplink data is transmitted, the terminal device may transmit the data by reasonable use of the ATSSS rule and QoS parameters.

Figure 1:
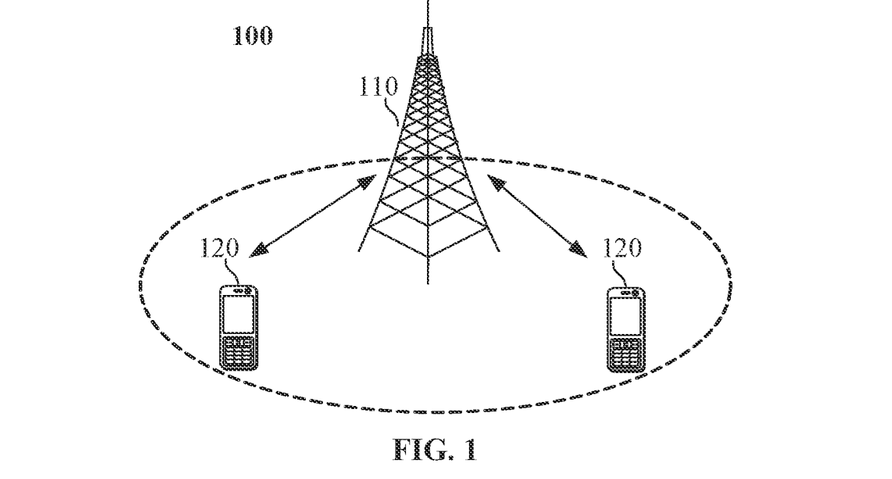
FIG. 1 is a schematic diagram of architecture of a communication system according to an embodiment of the disclosure.

Exemplarily, a communication system 100 to which the embodiments of the disclosure are applied is illustrated in FIG. 1. The communication system 100 may include a network device 110, and the network device 110 may be a device communicating with a terminal device 120 (or called a communication terminal and a terminal). The network device 110 may provide communication coverage for a specific geographical region and may communicate with a terminal device located in the coverage. Alternatively, the network device 110 may be a Base Transceiver Station (BTS) in the GSM or the CDMA system, may also be a NodeB (NB) in the WCDMA system, and may further be an Evolutional Node B (eNB or eNodeB) in the LTE system or a wireless controller in a Cloud Radio Access Network (CRAN). Or the network device may be a mobile switching center, a relay station, an access point, a vehicle device, a wearable device, a hub, a switch, a network bridge, a router, a network-side device in a future 5G network, a network device in a future evolved Public Land Mobile Network (PLMN) or the like.

The communication system 100 further includes at least one terminal device 120 within the coverage of the network device 110. A "terminal device" used herein includes, but not limited to, a device arranged to receive/send a communication signal through a wired line connection, for example, through a Public Switched Telephone Network (PSTN), Digital Subscriber Line (DSL), digital cable and direct cable connections, and/or another data connection/network, and/or through a wireless interface, for example, for a cellular network, a Wireless Local Area Network (WLAN), a digital television network such as a Digital Video Broadcasting-Handheld (DVB-H) network, a satellite network and an Amplitude Modulated (AM)-Frequency Modulated (FM) broadcast transmitter, and/or another terminal device, and/or an Internet of Things (IoT) device. The terminal device arranged to communicate through a wireless interface may be called a "wireless communication terminal", a "wireless terminal" or a "mobile terminal." Examples of a mobile terminal include, but not limited to, a satellite or cellular telephone, a Personal Communication System (PCS) terminal capable of combining a cellular radio telephone and data processing, faxing and data communication capabilities, a Personal Digital Assistant (PDA) including a radio telephone, a pager, Internet/intranet access, a Web browser, a notepad, a calendar and/or a Global Positioning System (GPS) receiver, a conventional laptop and/or palmtop receiver or another electronic device including a radio telephone transceiver. The terminal device may refer to an access terminal, a UE, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a PDA, a handheld device with a wireless communication function, a computing device, another processing device connected to a wireless modem, a vehicle-mounted device, a wearable device, a terminal device in the 5G network, a terminal device in the future evolved PLMN or the like.

In at least one embodiment, the terminal devices 120 may perform Device to Device (D2D) communication.

In at least one embodiment, the 5G system or the 5G network may also be called an NR system or an NR network.

A network device and two terminal devices are exemplarily illustrated in FIG. 1. In at least one embodiment, the communication system 100 may include multiple network devices and another number of terminal devices may be included in coverage of each network device. There are no limits made thereto in the embodiments of the disclosure.

In at least one embodiment, the communication system 100 may further include another network entity such as a network controller and a mobility management entity. There are no limits made thereto in the embodiments of the disclosure.

It is to be understood that a device with a communication function in the network/system in the embodiments of the disclosure may be called a communication device. For example, for the communication system 100 illustrated in FIG. 1, a communication device may include the network device 110 and terminal device 120 with the communication function, and the network device 110 and the terminal device 120 may be the specific devices mentioned above and will not be elaborated herein. The communication device may further include other devices in the communication system 100, for example, other network entities such as a network controller and a mobility management entity. There are no limits made thereto in the embodiments of the disclosure.

It is to be understood that terms "system" and "network" in the disclosure may usually be exchanged in the disclosure. In the disclosure, the term "and/or" is only an association relationship describing associated objects and represents that three relationships may exist. For example, A and/or B may represent three conditions: i.e., independent existence of A, existence of both A and B and independent existence of B. In addition, the character "/" in the disclosure usually represents that previous and next associated objects form an "or" relationship.

In an interworking architecture of 4G and 5G networks, a Public Data Network (PDN) GateWay Control (PGW-C) in a 4G CN and a Session Management Function (SMF) in 5G have substantially the same functions, both are network functions for session management. The two network functions are universal and may be integrated, for example, they may be represented as PGW-C+SMF.

Figure 2:
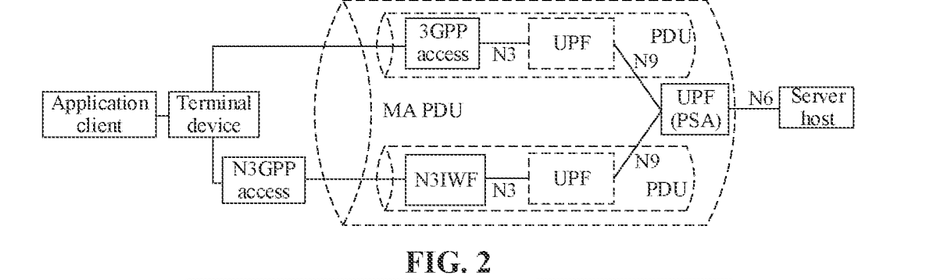
FIG. 2 is a schematic diagram of establishing an MA PDU session according to an embodiment of the disclosure.

FIG. 2 is a schematic diagram of establishing an MA PDU session according to an embodiment of the disclosure. As illustrated in FIG. 2, an application client controls a terminal device (including a Residential Gateway (RG)) to communicate with a server host through an MA PDU session. The MA PDU session includes two routes (or called "legs"), one route being a PDU session established by use of a 3GPP access technology and the other being a PDU session, or called a child PDU session, established by use of an N3GPP access technology.

At present, the two routes, established by use of 3GPP access and N3GPP access, of the MA PDU session are in a 5GC. Specifically, as illustrated in FIG. 2, for the PDU session established by use of the 3GPP access technology, the terminal device establishes an MA PDU session with a User Plane Function (UPF) entity through a 3GPP access module and reaches the server host through the UPF entity (or a PDU Session Anchor (PSA)). For the child PDU session established by use of the N3GPP access technology, the terminal device establishes another child PDU session with the UPF entity through an N3GPP access module and a Non-3GPP InterWorking Function (N3IWF), and reaches the server host through the UPF entity (or the PSA).

The 3GPP access module may communicate with the UPF entity through an N3 interface, the N3IWF may communicate with the UPF entity through an N3 interface, the UPF entity may communicate with an UPF entity (or the PSA) through an N9 interface, and the UPF entity (or the PSA) may communicate with the server host through an N6 interface. In addition, the UPF entity on the left of the N9 interface may change along with movement of the terminal device, but the UFP entity (or the PSA) on the right of the N9 interface usually may not change.

When the two routes illustrated in FIG. 2 are established, an SMF may further allocate an ATSSS rule to the terminal device, and the ATSSS rule is used for the terminal device to determine an access type that should be used for an uplink data packet to be transmitted. In addition, a QoS rule may also be allocated, and the QoS rule is used for the terminal device to determine a QoS flow that should be used for the uplink data packet to be transmitted. That is, when the terminal device is required to transmit uplink data, the terminal device uses two rules for data matching respectively. Moreover, a matching sequence of the two rules is not required to be limited, namely the sequence does not influence transmission of the uplink data.

The two routes, established by use of 3GPP access and N3GPP access, of the MA PDU session are in the 5GC. If one of the two routes is in the 5GC and the other is in an EPC, one set of ATSSS rule and two sets of QoS parameters (one set corresponds to the EPC and the other set corresponds to the 5GC) may be required to be allocated to the terminal device. However, when the uplink data is transmitted, the terminal device does not know the specific set of QoS parameter that is supposed to be used for data transmission. Therefore, the embodiments of the disclosure disclose a data transmission method, which may solve this problem.

Figure 3:
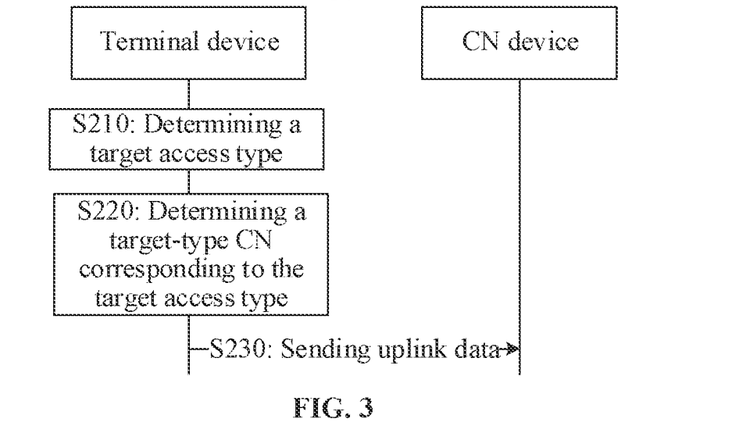
FIG. 3 is a schematic diagram of a data transmission method according to an embodiment of the disclosure.

FIG. 3 is a schematic flowchart of a data transmission method 200 according to an embodiment of the disclosure. The method 200 may be executed by a terminal device and a CN device together. For example, the terminal device may be the terminal device illustrated in FIG. 1, and the CN device may include a PGW-C+SFM, or may also be another CN device, for example, further including an SMF. The embodiment of the disclosure is not limited thereto.

As illustrated in FIG. 3, the method 200 includes the following operation. In S210, a target access type is determined. Specifically, the terminal device may determine the target access type for uplink data in multiple different access types. For example, the different access types may include 3GPP access and N3GPP access, and correspondingly, the target access type may be 3GPP access or N3GPP access. However, the embodiment of the disclosure is not limited thereto.

It is to be understood that the terminal device may determine the target access type for the uplink data in the multiple different access types in various manners. For example, the terminal device may determine the target access type corresponding to the uplink data to be transmitted in the multiple different access types according to a correspondence between an access service and an access type. The correspondence between the access service and the access type may include an ATSSS rule. Tat is, the terminal device may determine the target access type according to the ATSSS rule.

Before the operation in S210, the method 200 may further include that: the terminal device receives an ATSSS rule sent by the CN device. The ATSSS rule is used for indicating the target access type, to enable the terminal device to determine the target access type.

As illustrated in FIG. 3, the method 200 further includes the following operation. In S220, a target-type CN corresponding to the target access type is determined. Specifically, the terminal device may determine the target-type CN corresponding to the target access type according to a correspondence between an access type and a CN type.

Figure 4:
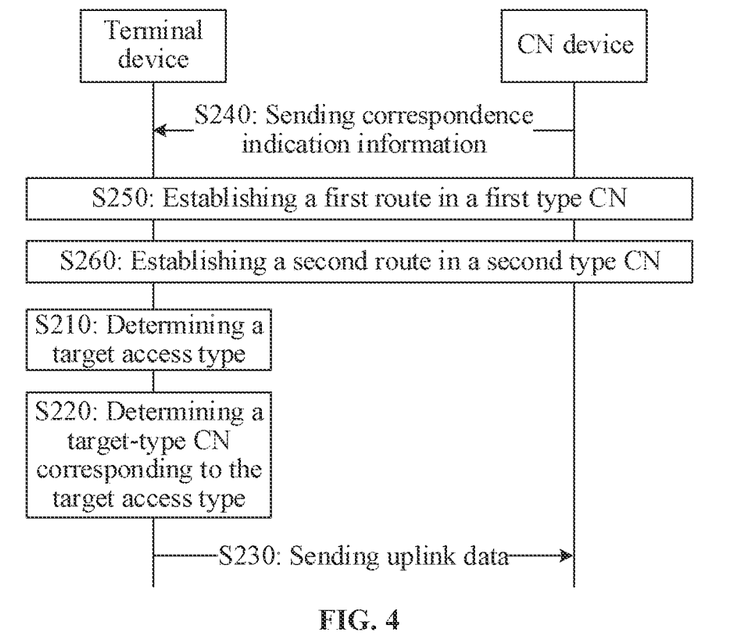
FIG. 4 is another schematic flowchart of a data transmission method according to an embodiment of the disclosure.

It is to be understood that FIG. 4 is another schematic diagram of the data transmission method 200 according to the embodiment of the disclosure. As illustrated in FIG. 4, the method 200 may further include the following operation. In S240, correspondence indication information is sent. Specifically, the CN device sends the correspondence indication information to the terminal device. The correspondence indication information is configured to indicate a correspondence between different access types and CN types.

For convenient description, descriptions are made herein with the condition that the correspondence includes the following relationships as an example: a first type CN corresponds to a first access type, and a second type CN corresponds to a second access type. The first type CN and the second type CN may be the same and may also be different, and the first access type and the second access type may be the same and may also be different.

For example, the first type CN may be an EPC or a 5GC, and the second type CN may also be an EPC or a 5GC. The first access type may be 3GPP or N3GPP, and the second access type may also be 3GPP or N3GPP.

For example, when the first type CN is an EPC, the second type CN may be a 5GC.

For another example, when the first type CN is a 5GC, the second type CN may also be a 5GC, and in such case, correspondingly, the first access type may be N3GPP, and the second access type may be 3GPP.

It is to be understood that, as an embodiment, descriptions are made herein with the condition that the first type CN is different from the second type CN and the first access type is also different from the second access type. For example, the first type CN is an EPC, the corresponding first access type is 3GPP, the second type CN is a 5GC, and the corresponding second access type is N3GPP: or, the first type CN is an EPC, the corresponding first access type is N3GPP, the second type CN is a 5GC, and the corresponding second access type is 3GPP. However, the embodiment of the disclosure is not limited thereto.

It is to be understood that, if the terminal has been registered in the 5GC before, there may be a UE Route Selection Policy (URSP) transmitted by the network in the terminal device, and the URSP may include the correspondence indication information, that is, the CN type corresponding to each access type is indicated through the URSP. For example, the terminal device may determine the CN types that are supposed to be used for 3GPP and N3GPP respectively according to the URSP.

In at least one embodiment, the URSP may include other information. For example, the URSP may further be configured to indicate an access type preference. The embodiment of the disclosure is not limited thereto.

In the embodiment of the disclosure, the terminal device may establish a PDU session according to the correspondence indication information received from the CN device. Since the two access types 3GPP and N3GPP are adopted as examples herein, the PDU session is an MA PDU session and is called an MA PDU session hereinafter for distinction. Specifically, the operation that the terminal device establishes the MA PDU session according to the correspondence indication information may specifically include the operations in S250 and S260.

As illustrated in FIG. 4, the method 200 may further include the following operation. In S250, a first route is established in a first type CN. Specifically, the terminal device establishes the first route of the MA PDU session in the first type CN over the first access type.

For convenient description, descriptions are made with the condition that the first type CN is an EPC as an example herein, and in such case, the terminal device establishes the first route of the MA PDU session in the EPC over the first access type. The first access type may be 3GPP (for example, Evolved-UMTS Terrestrial Radio Access (E-UTRA)) or N3GPP.

Specifically, the terminal device establishes a PDN connection in the EPC, and the PDN connection corresponds to the first route of the MA PDU session. In at least one embodiment, the terminal device may establish the PDN connection with a UPF network function of the CN device in the EPC.

It is to be understood that, when or after the terminal device establishes the PDN connection, the method 200 further includes that: the terminal device establishes an Evolved Packet System (EPS) bearer. Specifically, the terminal device, when establishing the EPS bearer in the EPC, may receive an EPS bearer context and a corresponding 5G QoS flow context simultaneously. However, the terminal device only uses the EPS bearer context and does not use the QoS flow context, namely only the EPS bearer is used.

It is to be understood that the method 200 may further include the following operation. The terminal device receives a first QoS parameter set sent by the CN device (for example, the PGW-C+SMF), and the first QoS parameter set includes a QoS parameter of at least one first data flow of the first route. For example, if the first type CN is an EPC, the first data flow is an EPS bearer.

In at least one embodiment, the first QoS parameter set may further include a QoS parameter of a 5G QoS flow corresponding to the EPS bearer.

In the embodiment of the disclosure, the same or different Packet Filter(s) (PFs) may be adopted for the EPS bearer and the corresponding QoS flow. For example, the PF(s) for the EPS bearer may be greater than or more than the PF(s) for the QoS flow. When the uplink data needs to be transmitted, the uplink data to be transmitted may be filtered according to the PF(s) for the EPS bearer.

As illustrated in FIG. 4, the method 200 may further include the following operation. In S260, a second route is established in a second type CN. Specifically, the terminal device establishes the second route of the MA PDU session in the second type CN over the second access type.

In S250, descriptions are made with the condition that the first type CN is an EPC as an example. Herein, in S260, descriptions are made with the condition that the second type CN is a 5GC as an example, and in such case, the terminal device establishes the second route of the MA PDU session in the 5GC over the second access type. The second access type is 3GPP or N3GPP. For example, the first access type is 3GPP, and the second access type is N3GPP.

Specifically, the terminal device establishes a PDU session in the 5GC, and the PDU session corresponds to the second route of the MA PDU session. In at least one embodiment, the terminal device may establish the PDU session with the UPF network function of the CN device in the 5GC.

It is to be understood that, when or after the terminal device establishes the PDU session, the method 200 further includes that: the terminal device establishes a QoS flow. Specifically, when the terminal device establishes the QoS flow in the 5GC, the terminal device may receive the QoS flow context.

It is to be understood that the method 200 may further include that: the terminal device receives a second QoS parameter set sent by the CN device (for example, the PGW-C+SMF). The second QoS parameter set includes a QoS parameter of at least one second data flow of the second route. For example, if the second type CN is a 5GC, the second data flow is a QoS flow.

In at least one embodiment, the CN device may only send a QoS parameter of a QoS flow required to be added or updated in the second QoS parameter set. Specifically, since the first QoS parameter set may include a QoS parameter of a QoS flow, the PGW-C+SMF may not send a QoS parameter that has been sent in the first QoS parameter set but only send the QoS parameter of the QoS flow required to be updated or added in the second QoS parameter set. That is, the second QoS parameter set may not include QoS parameters in the first QoS parameter set, and in such case, the terminal device determines the QoS parameter of the at least one second data flow according to the first QoS parameter set and the second QoS parameter set. That is, the terminal device combines parameters of the QoS flows in the first QoS parameter set and the second QoS parameter set as QoS parameters of QoS flows applied to the 5GC.

In at least one embodiment, the CN device may also include QoS parameters of all QoS flows in the second QoS parameter set, namely whether the QoS parameters have been sent in the first QoS parameter set is not distinguished.

In such case, the terminal device may determine QoS parameters of the QoS flows in the 5GC according to the second QoS parameter set.

In at least one embodiment, before the terminal device completes establishment of the first route and the second route, the method 200 may further include that: the terminal device sends capability information to the CN device, the capability information being configured to indicate that the terminal device supports establishment of the first route and the second route. Specifically, the terminal device may notify the PGW-C+SFM whether it supports establishment of the MA PDU session in the EPC and the 5GC through the capability information.

If the capability information indicates that the terminal device supports establishment of the first route and the second route, the method 200 may further include that: the terminal device receives response information sent by the CN device according to the capability information, the response information being configured to indicate that the CN device allows the terminal device to establish the first route and the second route. Specifically, the PGW-C+SMF may determine whether to allow use of an interworking mode according to information of an Access Point Name (APN), a local configuration and the like and notify a result to the terminal device. For example, the response information may be any parameter, and it is indicated through the parameter that the terminal device is allowed to establish the first route and the second route.

As illustrated in FIG. 3 or FIG. 4, the method 200 may further include the following operation. In S230, uplink data is sent. Specifically, the terminal device sends the uplink data by using at least one data flow corresponding to the target-type CN. For example, the terminal device may send the uplink data to the SMF included in the CN device. The terminal device establishes the first route and the corresponding at least one first data flow and establishes the second route and the corresponding at least one second data flow according to the abovementioned operations. When the terminal device needs to transmit the uplink data, the terminal device may preferably determine an access type used for the uplink data as the target access type according to the ATSSS rule and then determine the data flow used for the uplink data in the at least one data flow corresponding to the target-type CN by use of a PF for the target-type CN corresponding to the target access type.

For example, when the target access type is the first access type, the target-type CN is the first type CN, and the data flow for transmitting the uplink data is the first data flow.

For another example, the terminal device determines according to the ATSSS rule that the target access type is 3GPP access, and if the target-type CN corresponding to the 3GPP access is an EPC, the terminal device filters the uplink data to be transmitted by use of a PF in the EPS bearer context of the EPC, namely the uplink data is transmitted through the EPS bearer.

The ATSSS rule may be sent to the terminal device in any abovementioned process, for example, when, before or after the operations in S250 and S260 are executed, for the terminal device to determine the target access type.

It is to be understood that, considering that there may be one or more QoS flows in a PDU session, the QoS flow may be divided into two types, i.e., Guaranteed Bit Rate (GBR) and non-GBR types. Similarly, there may be one or more EPS bearers in a PDN connection, and the EPS bearer may also be divided into two types, i.e., non-GBR and GBR types.

According to an existing standard, two routes established for an MA PDU session are in a 5GC, but only one route is available for a GBR QoS flow of the MA PDU session, namely only an Access Network (AN) of one side has a QoS flow context. When an access type is required to be changed for the GBR QoS flow, the PGW-C+SMF notifies a new AN to establish a user plane resource and notifies an old AN to release a user plane resource.

Similarly, one route is available for a GBR data flow in the embodiments of the disclosure. Considering that when the EPS bearer is established in the EPC, the terminal device may further receive and store the QoS flow context corresponding to the EPS bearer while receiving and storing the EPS bearer context, but the terminal device only uses the EPS bearer context. Therefore, the corresponding QoS flow context does not need to be deleted when the GBR data flow is transferred from the EPC to the 5GC, and the QoS flow context may be deleted when the GBR data flow is transferred from the 5GC to the EPC.

Specifically, for the GBR data flow in the at least one first data flow, called a first GBR data flow herein, the method 200 further includes that: the terminal device and the CN device delete a context of the first GBR data flow and keep a second data flow context corresponding to the first GBR data flow. The second data flow context is obtained when the first GBR data flow is established or modified by the terminal device.

In at least one embodiment, the method 200 may further include the following operations. The terminal device receives first indication information sent by the CN device, and the terminal device keeps the second data flow context according to the first indication information.

For example, if the first GBR data flow is a GBR EPC bearer and the PGW-C+SMF instructs the terminal device to transfer a GBR EPC bearer from the EPC to the 5GC, the PGW-C+SMF and the terminal device may release a corresponding dedicated bearer in the EPC, namely the EPC bearer context is deleted. However, both the terminal device and the PGW-C+SMF do not delete the QoS flow context of the QoS flow corresponding to the EPC bearer.

In at least one embodiment, for the GBR data flow in the at least one second data flow, called a second GBR data flow herein, the method 200 further includes the following operations. The terminal device and the PGW-C+SMF delete a context of the second GBR data flow, and in addition, the terminal device may store a received first data flow context, which is sent by the CN device and corresponds to the second GBR data flow.

In at least one embodiment, the method 200 may further include the following operations. The terminal device receives second indication information sent by the CN device, and the terminal device deletes the context of the second GBR data flow according to the second indication information.

For example, if the second GBR data flow is a GBR QoS flow and the PGW-C+SMF transfers a GBR QoS flow from the 5GC to the EPC, the PGW-C+SMF releases the QoS flow in the 5GC, and the terminal device and the PGW-C+SMF delete the QoS flow context of the QoS flow. When the GBR EPS bearer is established in the EPC, the terminal device may receive and store the EPS bearer context and the corresponding QoS flow context, but the terminal device only uses the EPS bearer context.

Accordingly, in the data transmission method of the embodiments of the disclosure, for establishment of an MA PDU session across CNs by the terminal device, the terminal device, during transmission of uplink data, determines an access type firstly by use of the ATSSS rule and then determines a corresponding QoS flow by use of the QoS rule. Therefore, when the uplink data is transmitted, the terminal device may transmit the data by reasonable use of the ATSSS rule and QoS parameters. In addition, a procedure of transferring the GBR QoS flow between the EPC and the 5GC by the terminal device and the PGW-C+SMF is also specified.

It is to be understood that, in various embodiments of the disclosure, a magnitude of a sequence number of each process does not mean an execution sequence and the execution sequence of each process should be determined by its function and an internal logic and should not form any limit to an implementation process of the embodiments of the disclosure.

In addition, the term "and/or" in the disclosure is only an association relationship describing associated objects and represents that three relationships may exist. For example, A and/or B may represent three conditions: i.e., independent existence of A, existence of both A and B and independent existence of B. In addition, the character "/" in the disclosure usually represents that previous and next associated objects form an "or" relationship.

The data transmission method according to the embodiments of the disclosure is described above in combination with FIG. 1 to FIG. 4 in detail. A terminal device and CN device according to the embodiments of the disclosure will be described below in combination with FIG. 5 to FIG. 9.

Figure 5:
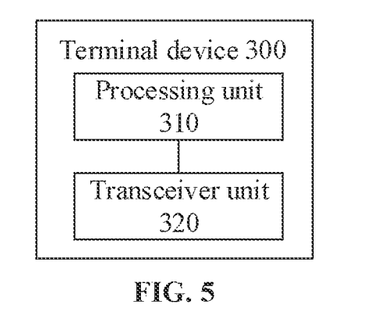
FIG. 5 is a schematic block diagram of a terminal device according to an embodiment of the disclosure.

As illustrated in FIG. 5, a terminal device 300 according to an embodiment of the disclosure includes a processing unit 310 and a transceiver unit 320. Specifically, the processing unit 310 is configured to determine a target access type for uplink data in multiple different access types and determine a target-type CN corresponding to the target access type according to a correspondence between an access type and a CN type. The transceiver unit 320 is configured to send the uplink data by using at least one data flow corresponding to the target-type CN.

In at least one embodiment, the processing unit 310 is configured to determine the target access type corresponding to the uplink data in the multiple different access types according to a correspondence between an access service and an access type.

In at least one embodiment, the correspondence between the access service and the access type includes an ATSSS rule.

In at least one embodiment, the transceiver unit 320 is further configured to receive correspondence indication information sent by a CN device. The correspondence indication information is used for indicating the correspondence.

In at least one embodiment, the correspondence indication information is in a URSP.

In at least one embodiment, the processing unit 310 is further configured to establish a PDU session according to the correspondence indication information.

In at least one embodiment, the correspondence includes that a first type CN corresponds to a first access type and a second type CN corresponds to a second access type. The processing unit 310 is configured to establish a first route of the PDU session in the first type CN over the first access type and establish a second route of the PDU session in the second type CN over the second access type.

In at least one embodiment, the transceiver unit 3220 is further configured to send capability information to the CN device. The capability information is configured to indicate that the terminal device supports establishment of the first route and the second route.

In at least one embodiment, the transceiver unit 320 is further configured to receive response information sent by the CN device according to the capability information. The response information is configured to indicate that the CN device allows the terminal device to establish the first route and the second route.

In at least one embodiment, the transceiver unit 320 is further configured to receive a first QoS parameter set sent by the CN device, the first QoS parameter set including a QoS parameter of at least one first data flow in the first route, and receive a second QoS parameter set sent by the CN device, the second QoS parameter set including a QoS parameter of at least one second data flow in the second route.

In at least one embodiment, the second QoS parameter set does not include QoS parameters in the first QoS parameter set. The processing unit 310 is further configured to determine the QoS parameter of the at least one second data flow according to the first QoS parameter set and the second QoS parameter set, the QoS parameter of the at least one second data flow including the QoS parameter of the at least one first data flow.

In at least one embodiment, if the target-type CN is the first type CN, the at least one data flow is the first data flow: or, if the target-type CN is the second type CN, the at least one data flow is the second data flow.

In at least one embodiment, the at least one first data flow includes a first GBR data flow, and the processing unit 310 is further configured to delete a context of the first GBR data flow and keep a second data flow context corresponding to the first GBR data flow. The second data flow context is obtained when the first GBR data flow is established or modified.

In at least one embodiment, the transceiver unit 320 is configured to receive first indication information sent by the CN device, and the processing unit 310 is further configured to keep the second data flow context according to the first indication information.

In at least one embodiment, the at least one second data flow includes a second GBR data flow, and the processing unit 310 is further configured to delete a context of the second GBR data flow and keep a first data flow context that is sent by the CN device and corresponds to the second GBR data flow.

In at least one embodiment, the transceiver unit 320 is further configured to receive second indication information sent by the CN device, and the processing unit 310 is configured to delete the context of the second GBR data flow according to the second indication information.

In at least one embodiment, the first type CN is an EPC, and the second type CN is a 5GC; or, the first type CN is the 5GC, and the second type CN is the EPC.

In at least one embodiment, the target-type CN is an EPC or a 5GC.

In at least one embodiment, the target access type is 3GPP access or N3GPP access.

It is to be understood that the abovementioned and other operations and/or functions of each unit in the terminal device 300 according to the embodiment of the disclosure are adopted to implement the corresponding operations executed by the terminal device in each method in FIG. 1 to FIG. 4 respectively and, for simplicity, will not be elaborated herein.

Accordingly, the terminal device of the embodiment of the disclosure, for establishment of an MA PDU session across CNs, when transmitting uplink data, determines an access type firstly by use of the ATSSS rule and then determines a corresponding QoS flow by use of the QoS rule. Therefore, when the uplink data is transmitted, the terminal device may transmit the data by reasonable use of the ATSSS rule and QoS parameters. In addition, a procedure of transferring the GBR QoS flow between the EPC and the 5GC by the terminal device and the PGW-C+SMF is also specified.

Figure 6:
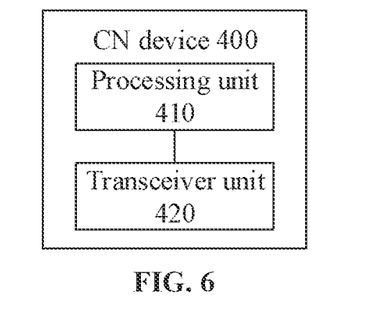
FIG. 6 is a schematic block diagram of a CN device according to an embodiment of the disclosure.

As illustrated in FIG. 6, a CN device 400 according to an embodiment of the disclosure includes a processing unit 410 and a transceiver unit 420. Specifically, the transceiver unit 420 is configured to send correspondence indication information to a terminal device. The correspondence indication information is configured to indicate a correspondence between an access type and a CN type, and the correspondence is configured for the terminal device to establish a PDU session.

In at least one embodiment, the correspondence indication information is in a URSP.

In at least one embodiment, the correspondence includes that a first type CN corresponds to a first access type and a second type CN corresponds to a second access type. The first access type is used for the terminal device to establish a first route of the PDU session in the first type CN and the second access type is used for the terminal device to establish a second route of the PDU session in the second type CN.

In at least one embodiment, the transceiver unit 420 is further configured to receive capability information sent by the terminal device, the capability information being configured to indicate that the terminal device supports establishment of the first route and the second route.

In at least one embodiment, the transceiver unit 420 is further configured to send response information to the terminal device according to the capability information, the response information being configured to indicate that the CN device allows the terminal device to establish the first route and the second route.

In at least one embodiment, the transceiver unit 420 is further configured to send a first QoS parameter set to the terminal device, the first QoS parameter set including a QoS parameter of at least one first data flow in the first route, and send a second QoS parameter set to the terminal device, the second QoS parameter set including a QoS parameter of at least one second data flow in the second route.

In at least one embodiment, the second QoS parameter set does not include QoS parameters in the first QoS parameter set, and the second QoS parameter set and the first QoS parameter set are used for the terminal device to determine the QoS parameter of the at least one second data flow.

In at least one embodiment, the at least one first data flow includes a first GBR data flow, and the processing unit 410 is configured to keep a second data flow context corresponding to the first GBR data flow.

In at least one embodiment, the transceiver unit 420 is further configured to send first indication information to the terminal device. The first indication information is configured to instruct the terminal device to keep the second data flow context and the second data flow context is obtained when the first GBR data flow is established or modified by the terminal device.

In at least one embodiment, the at least one second data flow includes a second GBR data flow, and the processing unit 410 is configured to delete a context of the second GBR data flow.

In at least one embodiment, the transceiver unit 420 is further configured to send second indication information to the terminal device. The second indication information is configured to instruct the terminal device to delete the context of the second GBR data flow.

In at least one embodiment, the first type CN is an EPC, and the second type CN is a 5GC; or, the first type CN is the 5GC, and the second type CN is the EPC.

In at least one embodiment, the first access type is 3GPP access, and the second access type is N3GPP access; or, the first access type is N3GPP access, and the second access type is 3GPP access.

It is to be understood that the abovementioned and other operations and/or functions of each unit in the CN device 400 according to the embodiment of the disclosure are adopted to implement the corresponding operations executed by the CN device (for example, the PGW-C+SMF) in each method in FIG. 1 to FIG. 4 respectively and, for simplicity, ill not be elaborated herein.

Accordingly, the CN device of the embodiment of the disclosure, for establishment of an MA PDU session across CNs by the terminal device, sends an ATSSS rule and a QoS rule to the terminal device, to enable the terminal device to, when transmitting uplink data, determine an access type preferably by use of the ATSSS rule and then determine a corresponding QoS flow by use of the QoS rule. Therefore, when the uplink data is transmitted, the terminal device may transmit the data by reasonable use of the ATSSS rule and QoS parameters. In addition, a procedure of transferring the GBR QoS flow between the EPC and the 5GC by the terminal device and the PGW-C+SMF is also specified.

Figure 7:
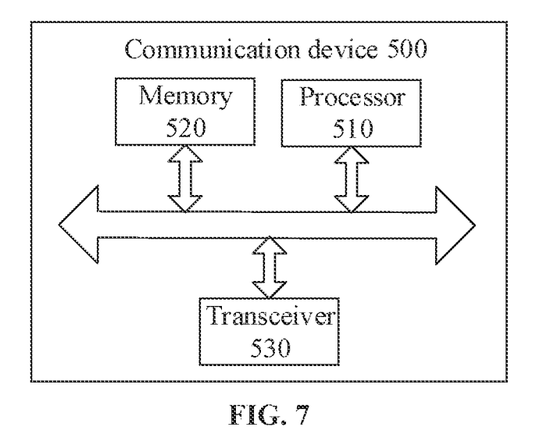
FIG. 7 is a schematic block diagram of a communication device according to an embodiment of the disclosure.

FIG. 7 is a schematic structure diagram of a communication device 500 according to an embodiment of the disclosure. The communication device 500 illustrated in FIG. 7 includes a processor 510. The processor 510 may call and run a computer program in a memory to implement the methods in the embodiments of the disclosure.

In at least one embodiment, as illustrated in FIG. 7, the communication device 500 may further include a memory 520. The processor 510 may call and run the computer program in the memory 520 to implement the methods in the embodiments of the disclosure.

The memory 520 may be an independent device independent of the processor 510 and may also be integrated into the processor 510.

In at least one embodiment, as illustrated in FIG. 7, the communication device 500 may further include a transceiver 530. The processor 510 may control the transceiver 530 to communicate with another device, specifically send information or data to the other device or receive information or data sent by the other device.

The transceiver 530 may include a transmitter and a receiver. The transceiver 530 may further include antennae, and the number of the antennae may be one or more.

In at least one embodiment, the communication device 500 may specifically be a CN device of the embodiments of the disclosure, and the communication device 500 may implement corresponding operations implemented by the CN device in each method of the embodiments of the disclosure. For simplicity, no more elaborations are made herein.

In at least one embodiment, the communication device 500 may specifically be the mobile terminal/terminal device of the embodiments of the disclosure, and the communication device 500 may implement corresponding operations implemented by the mobile terminal/terminal device in each method of the embodiments of the disclosure. For simplicity, no more elaborations are made herein.

Figure 8:
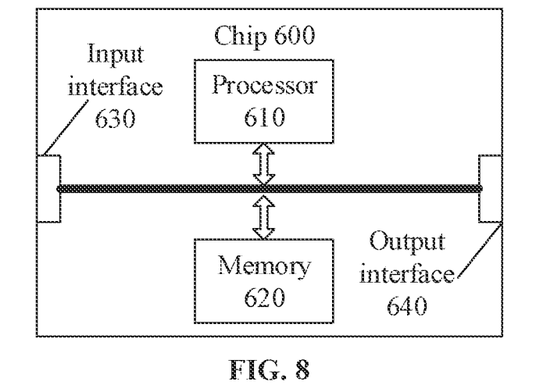
FIG. 8 is a schematic block diagram of a chip according to an embodiment of the disclosure.

FIG. 8 is a schematic structure diagram of a chip according to an embodiment of the disclosure. The chip 600 illustrated in FIG. 8 includes a processor 610. The processor 610 may call and run a computer program in a memory to implement the methods in the embodiments of the disclosure.

In at least one embodiment, as illustrated in FIG. 8, the chip 600 may further include a memory 620. The processor 610 may call and run the computer program in the memory 620 to implement the methods in the embodiments of the disclosure.

The memory 620 may be an independent device independent of the processor 610 and may also be integrated into the processor 610.

In at least one embodiment, the chip 600 may further include an input interface 630. The processor 610 may control the input interface 630 to communicate with another device or chip, specifically acquire information or data sent by the other device or chip.

In at least one embodiment, the chip 600 may further include an output interface 640. The processor 610 may control the output interface 640 to communicate with the other device or chip, specifically output information or data to the other device or chip.

In at least one embodiment, the chip may be applied to the CN device of the embodiments of the disclosure, specifically applied to any type of CN device, for example, the PGW-C+SMF of the embodiments of the disclosure, and the chip may implement corresponding operations implemented by the CN device in the methods of the embodiments of the disclosure. For simplicity, no more elaborations are made herein.

In at least one embodiment, the chip may be applied to the mobile terminal/terminal device of the embodiments of the disclosure, and the chip may implement corresponding operations implemented by the mobile terminal/terminal device in each method of the embodiments of the disclosure. For simplicity, no more elaborations are made herein.

It is to be understood that the chip mentioned in the embodiment of the disclosure may also be called a system-level chip, a system chip, a chip system or a system on chip, etc.

Figure 9:
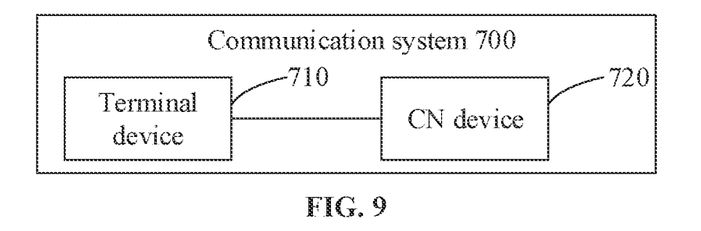
FIG. 9 is a schematic diagram of a communication system according to an embodiment of the disclosure.

FIG. 9 is a schematic block diagram of a communication system 700 according to an embodiment of the disclosure. As illustrated in FIG. 9, the communication system 700 includes a terminal device 710 and a CN device 720.

The terminal device 710 may be configured to realize corresponding functions realized by the terminal device in the methods, and the CN device 720 may be configured to realize corresponding functions realized by the CN device (for example, the PGW-C+SMF) in the methods. For simplicity, no more elaborations are made herein.

It is to be understood that the processor in the embodiment of the disclosure may be an integrated circuit chip and has a signal processing capability. In an implementation process, each operation of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, operation and logical block diagram disclosed in the embodiments of the disclosure may be implemented or executed. The universal processor may be a microprocessor or the processor may also be any conventional processor and the like. The operations of the method disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the operations of the methods in combination with hardware.

It can be understood that the memory in the embodiment of the disclosure may be a volatile memory or a nonvolatile memory, or may include both the volatile and nonvolatile memories. The nonvolatile memory may be a ROM, a PROM, an Erasable PROM (EPROM), an EEPROM or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is to be noted that the memory of the system and method described in the disclosure is intended to include, but not limited to, memories of these and any other proper types.

It is to be understood that the memory is exemplarily but unlimitedly described. For example, the memory in the embodiments of the disclosure may also be an SRAM, a DRAM, an SDRAM, a DDR SDRAM, an ESDRAM, an SLDRAM and a DR RAM. That is, the memory in the embodiments of the disclosure is intended to include, but not limited to, memories of these and any other proper types.

An embodiment of the disclosure also provides a computer-readable storage medium, which is configured to store a computer program.

In at least one embodiment, the computer-readable storage medium may be applied to a CN device in the embodiments of the disclosure, and the computer program enables a computer to execute corresponding operations implemented by the CN device in each method of the embodiments of the disclosure. For simplicity, elaborations are omitted herein.

In at least one embodiment, the computer-readable storage medium may be applied to a mobile terminal/terminal device in the embodiments of the disclosure, and the computer program enables a computer to execute corresponding operations implemented by the mobile terminal/terminal device in each method of the embodiments of the disclosure. For simplicity, elaborations are omitted herein.

An embodiment of the disclosure further provides a computer program product, which includes a computer program instruction.

In at least one embodiment, the computer program product may be applied to a CN device in the embodiments of the disclosure, and the computer program instruction enables a computer to execute corresponding operations implemented by the CN device in each method of the embodiments of the disclosure. For simplicity, elaborations are omitted herein.

In at least one embodiment, the computer program product may be applied to a mobile terminal/terminal device in the embodiments of the disclosure, and the computer program instruction enables a computer to execute corresponding operations implemented by the mobile terminal/terminal device in each method of the embodiments of the disclosure. For simplicity, elaborations are omitted herein.

An embodiment of the disclosure further provides a computer program.

In at least one embodiment, the computer program may be applied to a CN device in the embodiments of the disclosure. The computer program, when runs in a computer, enables the computer to execute corresponding operations implemented by the CN device in each method of the embodiments of the disclosure. For simplicity, elaborations are omitted herein.

In at least one embodiment, the computer program may be applied to a mobile terminal/terminal device in the embodiments of the disclosure. The computer program, when runs in a computer, enables the computer to execute corresponding operations implemented by the mobile terminal/terminal device in each method of the embodiments of the disclosure. For simplicity, elaborations are omitted herein.

Those of ordinary skill in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A data transmission method, comprising:
   determining, by a terminal device, a target access type for uplink data in multiple different access types;
   determining, by the terminal device, a target-type core network (CN) corresponding to the target access type according to a correspondence between an access type and a CN type; and
   sending, by the terminal device, the uplink data using at least one data flow corresponding to the target-type CNS,
   wherein there is the correspondence between the access type and the CN type that a first type CN corresponds to a first access type, and a second type CN corresponds to a second access type;
   wherein the method further comprises:
   establishing, by the terminal device, a first route of a protocol data unit (PDU) session in the first type CN over the first access type; and
   establishing, by the terminal device, a second route of the PDU session in the second type CN over the second access type.

2. The method of claim 1, wherein determining, by the terminal device, the target access type for the uplink data in the multiple different access types comprises:
   determining, by the terminal device, the target access type corresponding to the uplink data in the multiple different access types according to a correspondence between an access service and an access type.

3. The method of claim 2, wherein the correspondence between the access service and the access type comprises an Access Traffic Steering, Switching, Splitting (ATSSS) rule.

4. The method of claim 1, further comprising:
   sending, by the terminal device, capability information to the CN device, the capability information being used for indicating that the terminal device supports establishment of the first route and the second route.

5. The method of claim 4, further comprising:
   receiving, by the terminal device, response information sent by the CN device according to the capability information, the response information being used for indicating that the CN device allows the terminal device to establish the first route and the second route.

6. The method of claim 1, further comprising:
receiving, by the terminal device, first Quality of Service (QoS) parameters sent by the CN device, the first QoS parameters comprising a QoS parameter of at least one first data flow in the first route; and
receiving, by the terminal device, second QoS parameters sent by the CN device, the second QoS parameters comprising a QoS parameter of at least one second data flow in the second route.

7. The method of claim 1, wherein the first type CN is an Evolved Packet Core (EPC), and the second type CN is a 5th-Generation Core (5GC); or
the first type CN is the 5GC, and the second type CN is the EPC.

8. The method of claim 1, wherein the target-type CN is an EPC or a 5GC.

9. The method of claim 1, wherein the target access type is 3rd Generation Partnership Project (3GPP) access or Non-3GPP (N3GPP) access.

10. The method of claim 1, wherein the method further comprises:
receiving, by the terminal device, correspondence indication information sent by an CN device, the correspondence indication information being used for indicating the correspondence between the access type and the CN type.

11. A terminal device, comprising:
a processor, configured to determine a target access type for uplink data in multiple different access types,
wherein the processor is further configured to determine a target-type core network (CN) corresponding to the target access type according to a correspondence between an access type and a CN type; and
a transceiver, configured to send the uplink data using at least one data flow corresponding to the target-type CN,
wherein there is the correspondence between the access type and the CN type that a first type CN corresponds to a first access type, and a second type CN corresponds to a second access type; and
the processor is further configured to:
establish a first route of a protocol data unit (PDU) session in the first type CN over the first access type; and
establish a second route of the PDU session in the second type CN over the second access type.

12. The terminal device of claim 11, wherein the processor is configured to:
determine the target access type corresponding to the uplink data in the multiple different access types according to a correspondence between an access service and an access type.

13. The terminal device of claim 12, wherein the correspondence between the access service and the access type comprises an Access Traffic Steering, Switching, Splitting (ATSSS) rule.

14. The terminal device of claim 11, wherein the transceiver is further configured to:
send capability information to the CN device, the capability information being used for indicating that the terminal device supports establishment of the first route and the second route.

15. The terminal device of claim 14, wherein the transceiver is further configured to:
receive response information sent by the CN device according to the capability information, the response information being used for indicating that the CN device allows the terminal device to establish the first route and the second route.

16. The terminal device of claim 11, wherein the transceiver is further configured to:
receive first Quality of Service (QoS) parameters sent by the CN device, the first QoS parameters comprising a QoS parameter of at least one first data flow in the first route; and
receive second QoS parameters sent by the CN device, the second QoS parameters comprising a QoS parameter of at least one second data flow in the second route.

17. The terminal device of claim 11, wherein the first type CN is an Evolved Packet Core (EPC), and the second type CN is a 5th-Generation Core (5GC); or
the first type CN is the 5GC, and the second type CN is the EPC.

18. The terminal device of claim 11, wherein the target-type CN is an EPC or a 5GC.

19. The terminal device of claim 11, wherein the target access type is 3rd Generation Partnership Project (3GPP) access or Non-3GPP (N3GPP) access.

20. The terminal device of claim 11, wherein the transceiver is further configured to:
receive correspondence indication information sent by an CN device, the correspondence indication information being used for indicating the correspondence between the access type and the CN type.

* * * * *